(12) United States Patent
LeBlanc et al.

(10) Patent No.: US 8,526,928 B2
(45) Date of Patent: Sep. 3, 2013

(54) METHOD AND SYSTEM FOR REPUBLISHING MOBILE CONTENT

(75) Inventors: Michael LeBlanc, Fredericton (CA); Jody Glidden, Sterling, VA (US); David James Hudson, Fredericton (CA); Jacob Samuel O'Reilly, Fredericton (CA)

(73) Assignee: BlackBerry Limited, Waterloo, Ontario (CA)

( * ) Notice: Subject to any disclaimer, the term of this patent is extended or adjusted under 35 U.S.C. 154(b) by 395 days.

(21) Appl. No.: 12/434,964

(22) Filed: May 4, 2009

(65) Prior Publication Data
US 2009/0318192 A1 Dec. 24, 2009

Related U.S. Application Data

(60) Provisional application No. 61/073,427, filed on Jun. 18, 2008.

(51) Int. Cl.
*H04M 3/00* (2006.01)
*H04L 29/06* (2006.01)

(52) U.S. Cl.
USPC ........................ 455/418; 455/414.3

(58) Field of Classification Search
USPC ........ 455/412.1–412.2, 414.2, 466, 418–420, 455/414.1, 414.3; 370/312
See application file for complete search history.

(56) References Cited

U.S. PATENT DOCUMENTS

| | | | | |
|---|---|---|---|---|
| 6,952,578 B1 * | 10/2005 | Pedersen et al. | ........... | 455/414.2 |
| 7,289,819 B2 * | 10/2007 | Hosono | .......... | 455/466 |
| 7,373,139 B2 * | 5/2008 | Suzuki | ....... | 455/414.2 |
| 7,561,899 B2 * | 7/2009 | Lee | ........ | 455/566 |
| 7,565,158 B1 * | 7/2009 | Aholainen | ..... | 455/458 |
| 7,706,783 B2 * | 4/2010 | Lim | ..... | 455/414.1 |
| 7,894,834 B1 * | 2/2011 | Zhang et al. | ...... | 455/466 |
| 7,957,691 B1 * | 6/2011 | Lee | ....... | 455/3.01 |
| 2003/0069991 A1 * | 4/2003 | Brescia | ...... | 709/245 |
| 2004/0156487 A1 * | 8/2004 | Ushiki et al. | ...... | 379/88.22 |
| 2005/0094617 A1 | 5/2005 | Lee | | |
| 2006/0235872 A1 * | 10/2006 | Kline et al. | ........ | 707/102 |
| 2007/0082657 A1 * | 4/2007 | Kim | ...... | 455/412.2 |
| 2007/0155307 A1 * | 7/2007 | Ng et al. | ..... | 455/3.01 |

(Continued)

FOREIGN PATENT DOCUMENTS

| | | |
|---|---|---|
| EP | 1826941 A1 | 8/2007 |
| WO | 2006080694 A1 | 8/2006 |
| WO | 2007081515 A1 | 7/2007 |

OTHER PUBLICATIONS

International Bureau of WIPO, International Search Report, issued in respect of International Application No. PCT/CA2009/000620, dated Jul. 8, 2009.
International Bureau of WIPO, Written Opinion of the International Searching Authority, issued in respect of International Application No. PCT/CA2009/000620, dated Jul. 9, 2009.

(Continued)

*Primary Examiner* — Brandon Miller
(74) *Attorney, Agent, or Firm* — Norton Rose Fulbright Canada LLP

(57) ABSTRACT

A system and method is provided for republishing content for a wireless device. In the wireless device, this may comprise: receiving a content manifest associated with a new content, the content manifest providing information about the new content; identifying any changes to existing content stored in the device, based on the information in the content manifest; retrieving updates in the new content corresponding to the changes; and storing the updates.

14 Claims, 7 Drawing Sheets

(56) References Cited

U.S. PATENT DOCUMENTS

| | | | |
|---|---|---|---|
| 2007/0220419 A1* | 9/2007 | Stibel et al. | 715/511 |
| 2008/0016144 A1* | 1/2008 | Hyun et al. | 709/203 |
| 2008/0108376 A1* | 5/2008 | Chen et al. | 455/466 |
| 2008/0301189 A1* | 12/2008 | Petit et al. | 707/104.1 |
| 2009/0144359 A1* | 6/2009 | Karlsen et al. | 709/203 |
| 2009/0209239 A1* | 8/2009 | Montesdeoca | 455/414.2 |

OTHER PUBLICATIONS

International Bureau of WIPO, International Preliminary Report on Patentability, issued in respect of International Application No. PCT/CA2009/000620, dated Dec. 18, 2010.

* cited by examiner

METHOD AND SYSTEM FOR REPUBLISHING MOBILE CONTENT

CROSS REFERENCE TO RELATED APPLICATIONS

The present application claims priority to U.S. Provisional Application No. 61/073,427 filed Jun. 18, 2008, the entirety of which is hereby incorporated by reference.

TECHNICAL FIELD

The present disclosure relates generally to portable devices, and more particularly to a method and system for republishing mobile content.

BACKGROUND

Currently, when a mobile learning content player receives content from a content server via either a push or pull model they will receive the full content package. This is true whether it is the first time that the mobile device has received the content package or if the content package that is being sent is an update. Current models for mobile content delivery may be limited in that: a) there is typically no manner in which the mobile content application can determine how much of the content package being sent is already on the mobile device; b) there is typically no manner in which the mobile content application can determine if parts of the content package are updated when compared to the data that is stored locally on the mobile device.

Some restrictions arising from such limitations may include: a) the mobile device must retrieve the entire content package each time; b) increased bandwidth usage in order to retrieve the entire content package each time that there is an update created; c) the increased bandwidth usage can contribute to the user exceeding the contractual amount of data allowed from their carrier in a month and thus incurring additional costs; d) for web based systems like a web browser, the user needs to explicitly access the individual asset to retrieve the updated copy. (i.e. it is not done automatically or triggered by the content server) This need for explicit access may be the case when a mobile web browser is just managing its local cache.

It would be desirable to have a method and system for delivering push content to mobile devices that does not waste processing resources or bandwidth in this way, and does not waste the time of the user of the device.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

Figure 1:
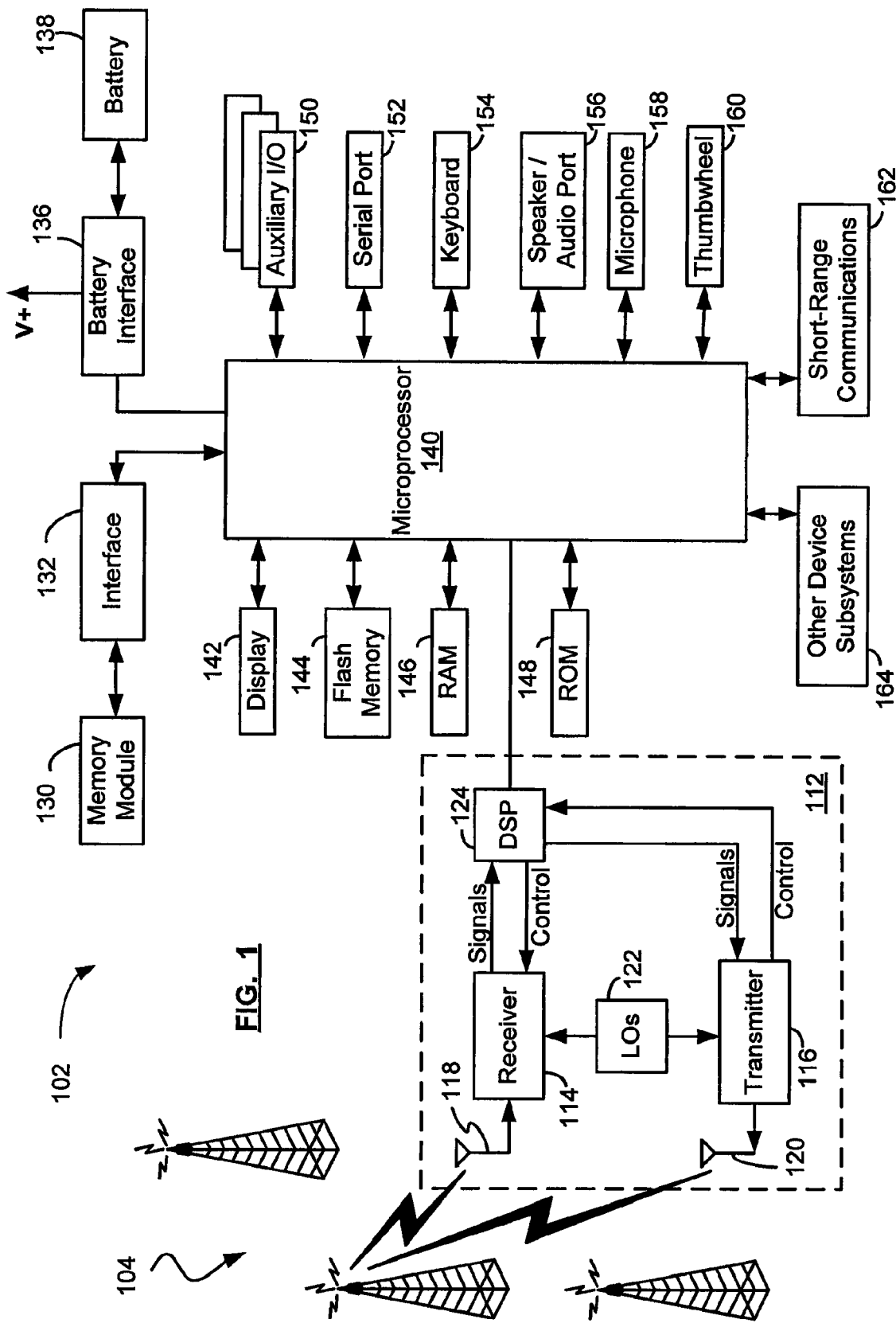
FIG. 1 shows in block diagram form a wireless device suitable for having a mobile content application in accordance with one embodiment.

In some aspects, there is provided a wireless device comprising: a processor for controlling operation of the wireless device; a first input device coupled to the processor for accepting an input; at least one display device coupled to the processor for communicating an output to the user; a communications subsystem coupled to the processor for communicating with a communications network, the communications network including a content server configurable for delivering content to the wireless device; a memory coupled to the processor; and a storage device coupled to the processor; the wireless device including one or more modules for republishing content for the wireless device, the one or more modules being configured to cause the wireless device to: receive a content manifest associated with a new content, the content manifest providing information about the new content; identify any changes to existing content stored in the storage device, based on the information in the content manifest; retrieve updates in the new content corresponding to the changes; and store the updates in the storage device.

In some aspects, there is provided a content delivery system for republishing content for a wireless device, the system comprising: a content server configurable to deliver content to the wireless device, the content server having a processor connected to a memory; and a mobile connector coupled to the content server for delivering the content to the wireless device, the content server having one or more modules stored in the memory and being configured to cause the content server to: send a content manifest to the wireless device, the content manifest being associated with new content and providing information about the new content; in response to a request from the wireless device, provide updates from the new content in accordance with a selection included in the request.

In some aspects, there is provided a method, in a wireless device, for republishing content for the wireless device, the method comprising: receiving, at the wireless device, a content manifest associated with a new content, the content manifest providing information about the new content; identifying, at the wireless device, any changes to existing content stored in the wireless device, based on the information in the content manifest, retrieving, from a content server, updates in the new content corresponding to the changes; and storing the updates in the wireless device.

In some aspects, there is provided a method, in a content server of a content delivery system, for republishing content for a wireless device, the method comprising: sending a content manifest to the wireless device, the content manifest being associated with new content and providing information about the new content; in response to a request from the wireless device, providing updates from the new content in accordance with a selection included in the request.

In the device, system and methods described above, the content manifest may include a verification piece for verifying the associated content. The verification piece may be used for identifying any changes to existing content. The device, system and methods described above may be practiced in the absence of any request from the wireless device for the content manifest.

Reference is first made to FIG. 1, which shows a block diagram illustrating a portable wireless device 102 that is suitable for having a mobile content application in accordance with one aspect of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager; a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a clickable thumbwheel, trackball, thumbwheel, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel or trackball 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel or trackball 160 in conjunction with the display 142 and possibly the auxiliary I/O device 150. The keypad 154 may be either a complete alphanumeric keypad or telephone-type keypad.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
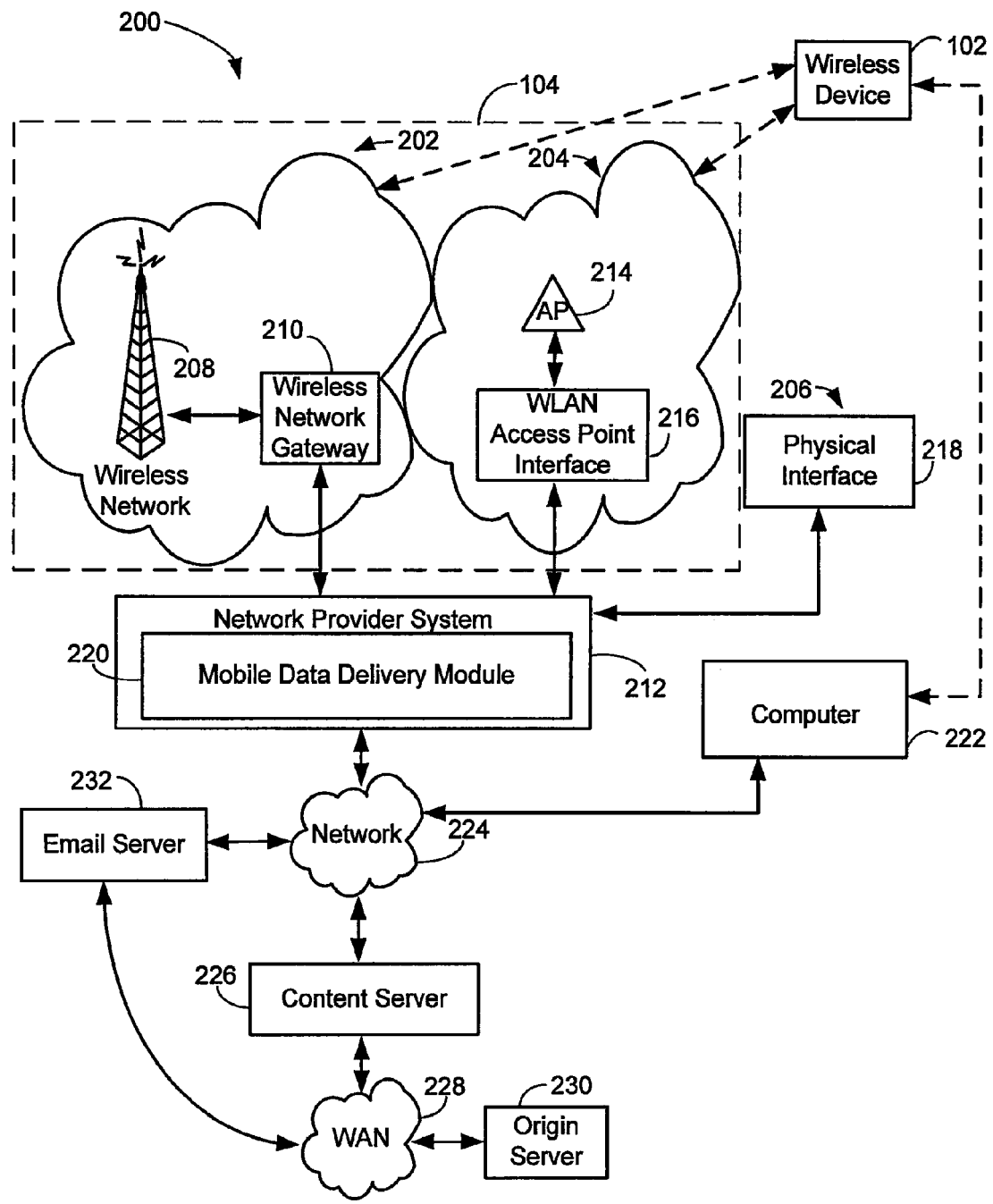
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Third Generation Partnership Project (3GPP or 3G), Evolution-Data Optimized (EV-DO), or 4G.

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
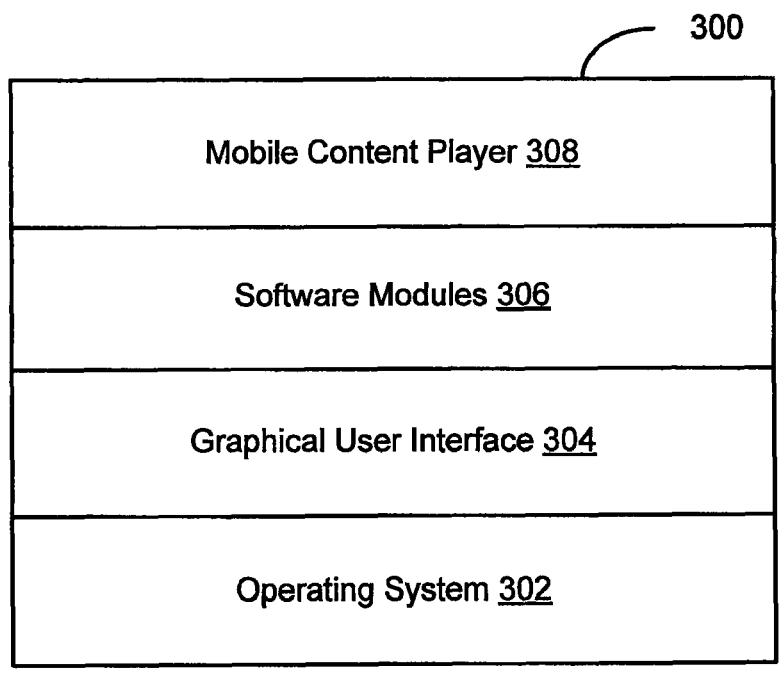
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154, the clickable thumbwheel or track ball 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes a mobile content application 308, which may also be referred to as a content delivery module. In one example, the mobile content application 308 may be integrated into the operating system 302. Alternatively, the module 308 may be a separate software component, as illustrated in FIG. 3. The mobile content application 308 may be responsible for managing push content delivery from multiple servers from the perspective of the wireless device 102 and/or playing the push content delivered from the multiple servers. Operation of the mobile content application 308 will be described in more detail below, in connection with FIGS. 5, 6, and 7.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied or stored on a computer readable medium (such as a DVD, CD, floppy disk or other storage media) which may be used for transporting the programmed instructions to the memory 300 of the wireless device 102. Alternatively, the programmed instructions may be embedded or carried in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
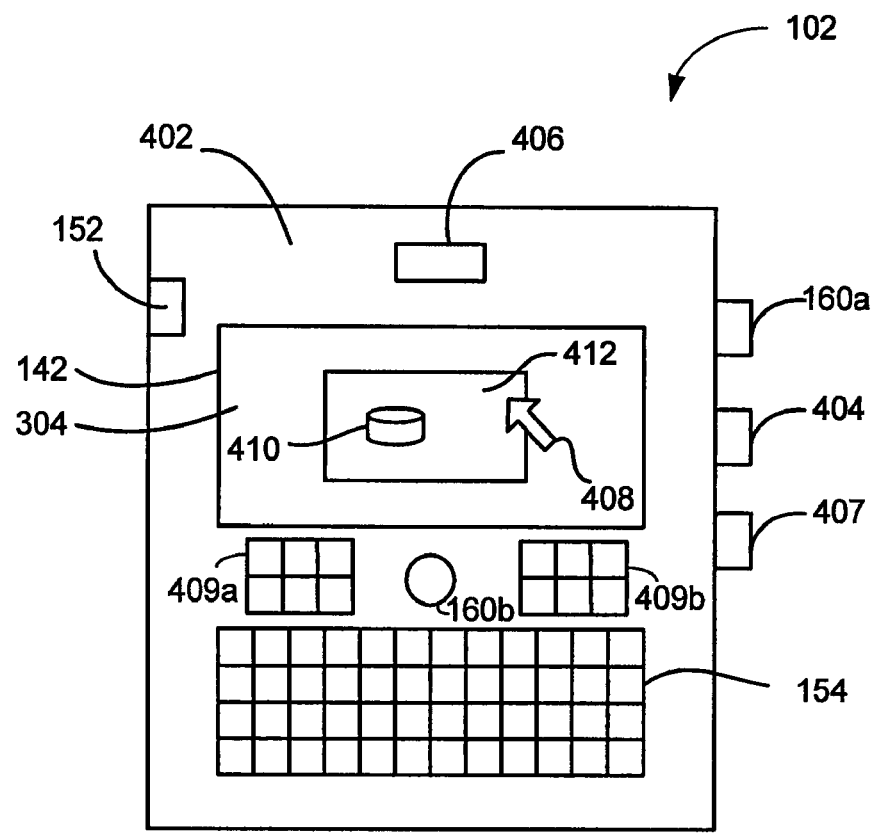
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumbwheel or scroll buttons 160a or other device for navigation such as a trackball 160b, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Additionally, the wireless device 102 may have a number of navigation control buttons represented by numerals 409a and 409b. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160*a*, the trackball 160*b*) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

In the present disclosure, the term "push" may be used to refer to a method of content delivery to a wireless device that may be automatically delivered by a content server without any action being required on the part of the wireless device or the user of the wireless device. In the present disclosure, the term "pull" may be used herein to refer to a method of content delivery to a wireless or mobile device that is initiated by the mobile device requesting the content from a content server with or without any action being required on the part of the mobile device user. A wireless device may also be referred to in the present disclosure as a mobile device.

In some aspects, the present disclosure provides a method for republishing mobile content. This may be useful for one or more of: reducing the time involved in publishing an update to mobile content applications; reducing the bandwidth required to publish an update to mobile content applications; reducing contractual data plan overruns and prevent additional billing due to bandwidth usage; ensuring content on the mobile content application is always current; and automatically delivering updated content to a local storage of a mobile device without the user needing to trigger the update.

Figure 5:
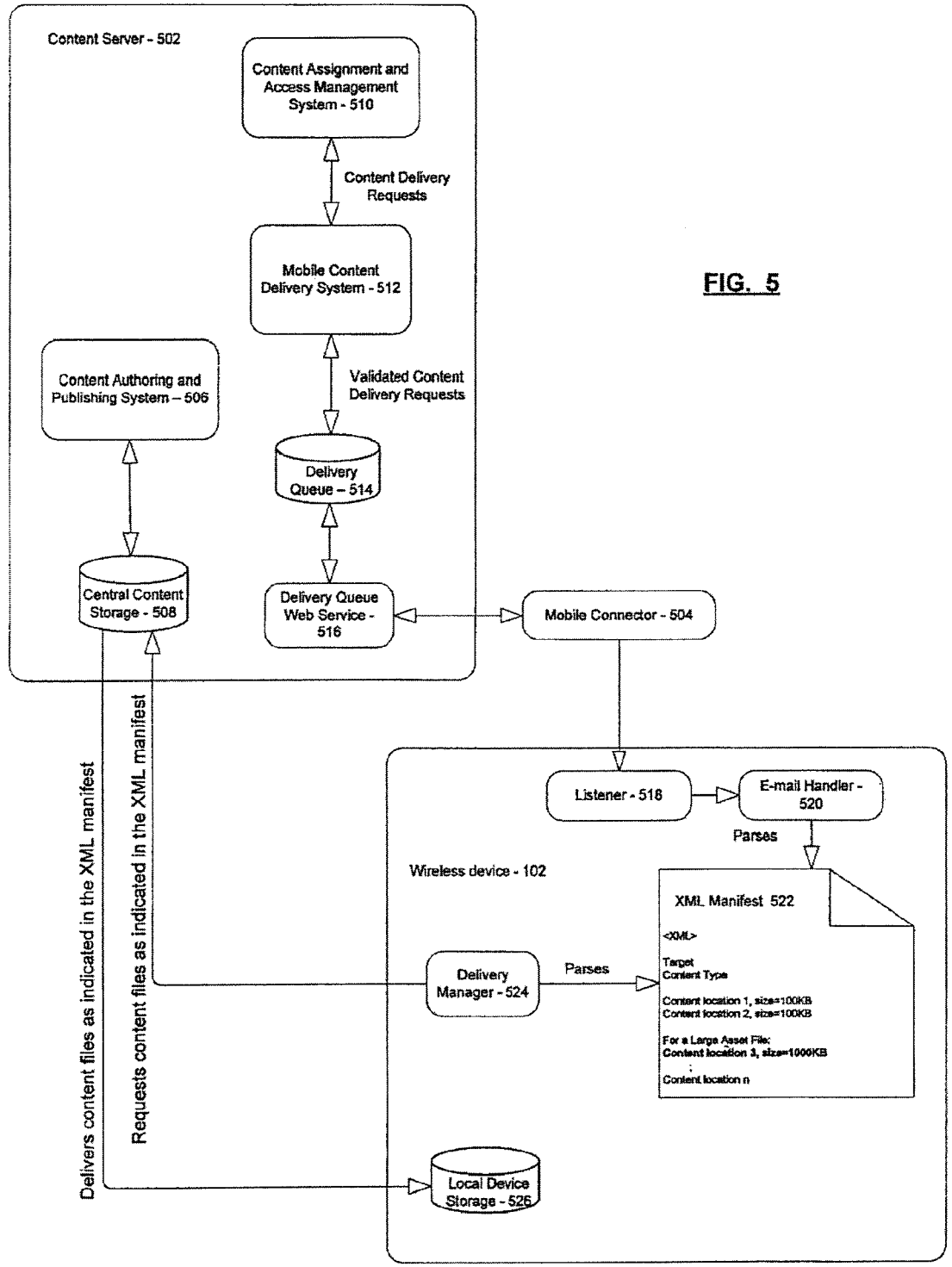
FIG. 5 shows in block diagram form aspects of the wireless device of FIG. 1 and the communication system of FIG. 2 suitable for republishing mobile content, in accordance with an embodiment.

Reference is now made to FIG. 5, which is a simplified block diagram showing aspects of the wireless device 102 and the communication system 200 suitable for republishing mobile content. The system shown in FIG. 5 is referred to collectively as the system 500.

The system 500 may generally include a content server 502, which may be implemented, for example, by the content server 226 shown in FIG. 2. The system may also include one or more wireless devices 102, only one of which is shown, which may also be referred to as a mobile device. The system 500 may also include a mobile connector 504, which may be implemented, for example, by the network provider system 220 of FIG. 2.

The content server 502 may generally include a content authoring and publishing system 506, a central content storage 508, a content assignment and access management system 510, a mobile content delivery system 512, a delivery queue 514, and a delivery queue web service 516.

The content authoring and publishing system 506 may be implemented using any of a number of systems known to those skilled in the art or using solutions yet to be developed, and may provide for creation and central storage of content formatted for wireless devices. The content may include two or more content items, such as two or more files, in which case the content may be referred to as a set of content. The authoring may be performed by a separate appropriate application and then saved to a central server, such as the central content storage 508, for access by the wireless device 102. For example, an audio clip may be authored in an audio editing tool, saved, and then published to a central content server, such as the central content storage 508. In some embodiments, access to this stored content may be managed by another system.

The content authoring and publishing system 506 may also be where an update or modification may be made to content stored in the central content server, e.g., for the purpose of updating content that has already been published. The content authoring and publishing system 506 may also include a verification piece (e.g. a checksum) for each file of the stored content when the content package is created. The verification piece may be included in a content package manifest file. The verification piece may be used to verify the content associated with the content manifest.

The content package manifest file, also referred to as the content manifest, may provide general information about the content associated with the manifest. For example, where the content manifest is an XML manifest file, the content manifest may contain URLs for retrieving the associated content. Generally, the content manifest may contain sufficient information for determining any specific updates to the associated content.

Once the content has been created, e.g., using the content authoring and publishing system 506, the content may be stored in the central content storage 508 for later access. Any content that has been updated or modified after being published may also be stored in this location.

Once the content has been authored, it may be assigned to a user or a wireless device 102. This assignment may provide a trigger for the delivery to the user or wireless device 102 to occur. Once a content package that has already been assigned is updated/modified, a push may be triggered through the content assignment and access management system 510 that may send the manifest file and the verification piece to the user or wireless device 102 that was assigned the original content package.

The content assignment and access management system 510 may make a request to the mobile content delivery system 512 to send all the content directly to the wireless device 102 to which the content has been assigned. This request may contain information on what type the content is (e.g., a Mobile Learning Course) and target user or device information so the delivery may be directed to specific wireless devices 102 belonging to specific individual users. The request may also contain information (e.g., a manifest file) that the content server 502 may use to find all elements of the content to be delivered. The content assignment may not require any knowledge of the mobile transport platform being used. This information may be configured in the mobile connector system 504 and may be related to the type of the wireless device 102.

The mobile content delivery system 512 may receive requests for delivering content. These requests may come from a system component that is assigning the content to users, such as the content authoring and publishing system 506 and/or the content assignment and access management system 510. When such requests are received, the mobile content delivery system 512 may look up the target user, and may determine if the user has a wireless device 102 and if the wireless device 102 has a transport defined. The request may be verified to be in the proper format and then processed. If the user does not have a wireless device 102 or if a transport has not been defined, then the appropriate response (e.g., an error message) may be returned to the requesting system. A user may register with the mobile content delivery system 512 to ensure the content deliveries can take place. Once all this information is gathered, the mobile content delivery system 512 may place the request, which may be an XML request, onto the delivery queue 514 with a status indicator of "New".

Each request, such as an XML request, may also be populated with a company identifier that may determine which company is authorized to view the request on the delivery queue 514. Modifications to the content may occur after the content has been delivered. It may be left to the original sender of the request (e.g., a calling application) to send a new delivery request for the content if it has changed.

The delivery queue web service 516 may listen for requests made by the mobile connector 504. These may be requests to determine if there are items on the delivery queue 514 that the mobile connector 504 may be able to extract and deliver.

The mobile connector 504 may poll the delivery queue web service 516 in predefined intervals to see if there is any content available that needs to be delivered. The mobile connector 504 may issue a web services call or request to the delivery queue web service 516. This call may contain user credentials that the web service 516 may authenticate against to determine what queue items the mobile connector 504 is authorized to see. If there are no items, the mobile connector 504 may wait for a predefined time interval to elapse and then may try again. If the mobile connector 504 does find an item on the delivery queue 514, the mobile connector 504 may retrieve the queued item, for example as an XML document describing the content, as has been described above with reference to the mobile content delivery system 512. The mobile connector 504 may only process one queued item at a time, but may alternatively be configured to process multiple items at a time.

When the mobile connector 504 receives, for example, an XML transaction from the web service 516, the mobile connector 504 may look up the intended transport required for the wireless device 102 type and may deliver the content to the wireless device 102. The mobile connector 504 may return result codes back to the delivery queue web service 516 based on the ability of the mobile connector 504 to successfully send the delivery request to the wireless device 102 infrastructure.

The mobile connector 504 may work simultaneously with several mobile platforms or transport types. This may include any transport that may allow a real-time delivery of content to the wireless device 102, or any mechanism that may publish the content directly onto the wireless device 102 wirelessly.

The wireless device 102 may include a listener 518, an email handler 520, a delivery manager 524, and local device storage 526 (e.g., the ROM 148 as shown in FIG. 1). The listener 518, the email handler 520, and the delivery manager 524 may be provided as part of the mobile content application 308.

The delivery manager 524 may process a manifest file, such as an XML manifest 522, by retrieving each item specified by URL in the manifest from the central content storage 508. Where the content or set of content includes two or more content items, each item of the content may be specified in the manifest. These items may be placed in the local device storage 526 of the wireless device 102, along with the associated verification piece (e.g. a checksum). In the case of a republished content package, the delivery manager 524 may compare the manifest list with the data that resides in the local device storage 526 and may determine if there are updates to the data. This determination may be made via comparing checksums or using any other suitable verification method, as would be known to a person skilled in the art.

The delivery manager 524 may then retrieve just the subset of the content that was determined to be different from what is already stored in the local device storage 526 and may overwrite any existing data with the newly retrieved, updated data.

Once the content is delivered to the wireless device 102, the content may remain in persistent storage, e.g., the local device storage 526, for rendering by the wireless device 102. The delivered content may be removed from either the wireless device 102 itself or from the mobile content delivery system 512. If the wireless device 102 attempts to render content that has been removed from the local device storage 526, then the wireless device 102 may attempt to retrieve the content from the content server 502. This attempt may be carried out automatically.

The listener 518 may listen for the request sent from the mobile connector 504. The listener 518 may receive content information in the form of a content manifest, e.g., the XML manifest 522, and may extract each content URL from the XML manifest 522. The content manifest, such as the XML manifest 522, may be received and stored in the memory 300 for use by the media content application 308, but may be a working data store as opposed to an application component. The listener 518 may then send that URL to the delivery manager 524 for content retrieval using the content URLs.

If a request is received via e-mail, the wireless device 102 may process the e-mail through the e-mail handler 520. The e-mail handler 520 may decrypt the contents of an email, if encrypted, containing instructions for retrieving the content manifest, may read the e-mail information into memory, and then may delete the e-mail from the e-mail inbox of the wireless device 102.

The e-mail handler 520 may use the information stored in memory to make a request, such as an HTTP request, to the content authoring and publishing system 506 requesting the content manifest. When the content authoring and publishing system 506 determines that a user's e-mail and PIN are valid, the content authoring and publishing system 506 may send the manifest to the wireless device 102, for example through a HTTP response.

Figure 6:
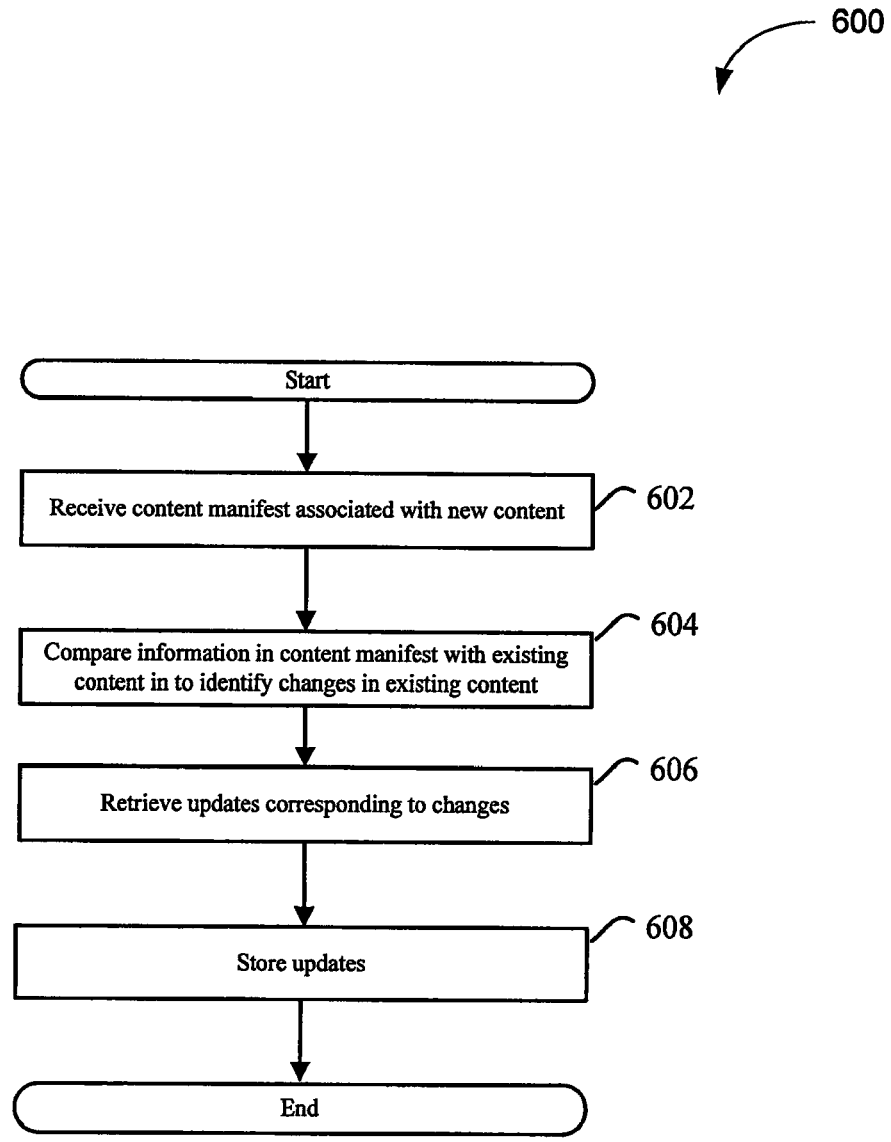
FIG. 6 is a flowchart illustrating a general method of republishing content for a wireless device in accordance with an embodiment.

Reference is now made to FIG. 6, which is a flowchart illustrating a general method 600 of republishing mobile content. The method 600 may be generally carried out at the wireless device 102.

At 602, a content manifest, such as an XML manifest, associated with new, updated or modified content is received at the wireless device 102. The content manifest may include information about the new content, such as content URLs, as described above. The content manifest may be sent to the wireless device 102 in the absence of any request from the wireless device 102.

At 604, any changes to existing content stored in the wireless device 102, for example existing data stored in the local device storage 526, is identified. This identification may be based on the information in the content manifest. This may be performed using a verification piece included in the content manifest, such as a checksum, as described above.

At 606, updates in the new content corresponding to the identified changes are retrieved. This may comprise the wireless device 102 sending a request to the content server 502 for the relevant content updates. Where the content or set of content includes two or more content items, the request may be a request for a subset of the two or more content items. The request may exclude any old content that has not changed from existing content, as discussed above.

At 608, the updates are stored in the wireless device 102, for example by overwriting existing data in the local device storage 526.

Figure 7:
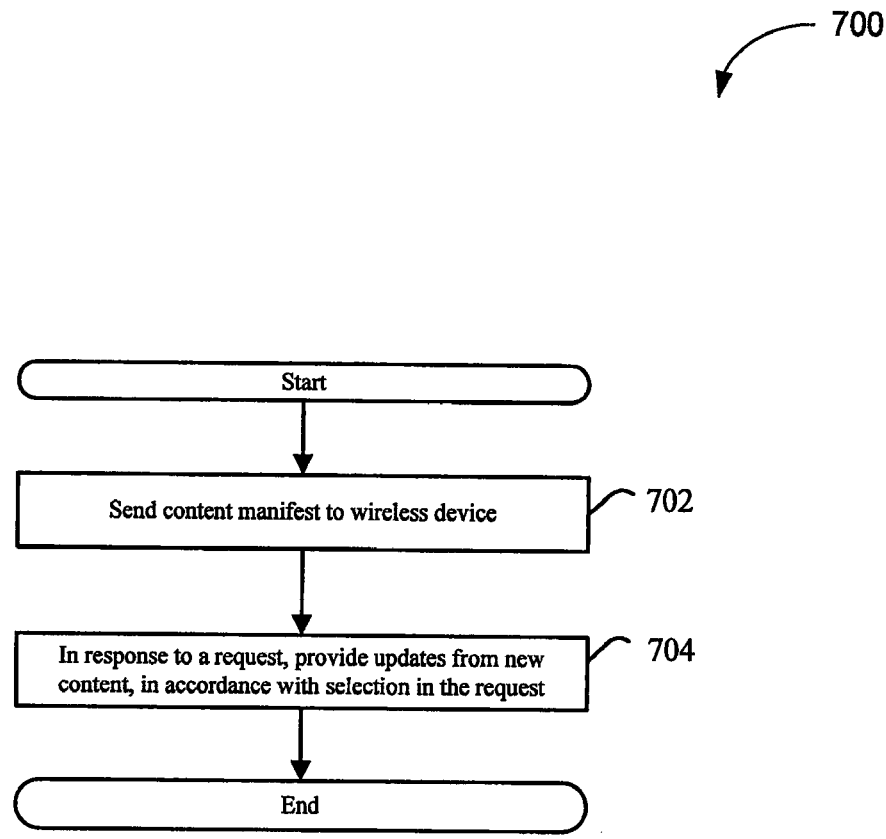
FIG. 7 is a flowchart illustrating a general method of republishing content for a wireless device in accordance with another embodiment.

Reference is now made to FIG. 7, which is a flowchart illustrating a general method 700 of republishing mobile content. The method 700 may be generally carried out by the system 500, more particularly by the content server 502.

At 702, a content manifest is sent to the wireless device. As described above, the content manifest, which may be the XML manifest file 522, may be associated with new, updated or changed content. The content manifest may provide information about the associated content, such as content URLs.

The content manifest may also include a verification piece, such as a checksum, for verifying the associated content. This verification piece may be included in the content manifest by the content server 502, for example using the content authoring and publishing system 506.

The content manifest may be sent to the wireless device 102 in the absence of any request from the wireless device 102 for the content manifest. For example, this may be the case where the content manifest is associated with new, updated or modified content. In some embodiments, where the content is assigned to a particular wireless device, the content manifest is sent to the wireless device 102 to which the associated content has been assigned. This may be managed by the content assignment and access management system 510, as described above. The content manifest, once received at the wireless device 102, may be compared by the wireless device 102 to determine any specific content updates, as described above with reference to FIG. 6. This comparison may result in a request from the wireless device 102 for the updates.

At 704, in response to a request from the wireless device 102, updates from the new, updated or modified content is provided to the wireless device 102. The updates may be provided in accordance with a selection included in the request. Where the content manifest specifies two or more content items, the request may select a subset of the two or more content items. The selection may select only updates that have changed from existing content that the wireless device 102 already has, and may exclude old content that is unchanged.

While the content servers 502 and mobile connectors 504 are represented as distinct components and have a number of sub-components, any of these components or subcomponents may be implemented as modules running on a number of interconnected servers or on a single server, depending on the design criteria of a particular application. For example, any of the components 502, 504, 506, 508, 510, 512, 514, and 516 may be implemented on any of the network provider system 212, the network 224, the content server 226, the email server 232, or the origin server 230. Alternatively, in one example, the components 502, 504, 506, 508, 510, 512, 514, and 516 may be implemented on a single one of the network provider system 212, the network 224, the content server 226, the email server 232, or the origin server 230. Additionally, a single content server 502 and a single mobile connector 504 are shown as an example in FIG. 5, the present description is intended to include any number of content servers (e.g., two or more) with mobile connectors operating to provide push content to the wireless devices 102.

While the steps of the method 600 and the method 700 are shown as occurring in a particular order, it will be appreciated by those skilled in the art that many of the steps are interchangeable and may occur in different orders than that shown without materially affecting the end results of the method 600 and the method 700. Although the method 600 and the method 700 have been described as being carried out with certain components of the wireless device 102 and certain components of the content server 502, other components may be used to carry out the functions of the method 600 and the method 700. Although the method 600 and the method 700 have been described together, they are not required to be carried out together, and may take place independently of each other.

The subject matter described above may be used by the wireless device 102 to receive mobile content updates from content servers 502. Possible applications of the disclosure include: a) training systems where courses are delivered to mobile users and groups from content publishers; for training systems the content publishers may be from a compliance content provider, internal company training material, external content publisher, etc; using the disclosed subject matter, the wireless device 102 may only request delivery of content that has been changed in comparison to the content stored locally in the wireless device 102; b) news readers through RSS feed delivered from content publishers may only deliver content that is new to a subscribing wireless device 102; c) delivering video and audio files from content publishers, such as any news site; and d) delivering applications and data files to the wireless device 102 from content publishers.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A content delivery system for republishing a set of content for a wireless device, the system comprising:

a content server configurable to deliver push content to the wireless device, the content server having a processor connected to a memory; and a mobile connector coupled to the content server for delivering the set of content to the wireless device by pushing the set of content to the wireless device, the content server having one or more modules stored in the memory and being configured to cause the content server to:

push a content manifest to the wireless device, the content manifest being associated with the set of content comprising at least two content items, the content manifest providing:

information for retrieving each of the at least two content items, and information for identifying each of the at least two content items; and in response to a request from the wireless device for a selection of one or more content items selected from the at least two content items, provide the selected one or more content items;

wherein content items are not provided to the wireless device until receipt of the request from the wireless device; and wherein when the set of content comprises at least one content item which was previously provided to the wireless device, the content manifest provides information for determining whether the previously provided at least one content item has been updated.

2. The content delivery system of claim 1, wherein the one or more modules of the content server comprise:

a content assignment and access management component for assigning the set of content to be delivered to a particular wireless device;

a mobile content delivery component coupled to the content assignment and access management component for handling delivery of the set of content to the wireless device;

a delivery queue coupled to the mobile content delivery component for holding requests for delivery; and a delivery queue web service coupled to the delivery queue for retrieving queued items.

3. The content delivery system according to claim 2, wherein the one or more modules of the content server further comprise:

a content authoring and publishing system for creating the set of content to be delivered to the wireless device; and a central storage device for storing the set of content to be delivered to the wireless device.

4. The content delivery system of claim 1 wherein the set of content is assigned to the wireless device, and the one or more modules are further configured to cause the content server to:

identify the wireless device to which the set of content is assigned; and send the content manifest to the wireless device to which the set of content is assigned, in the absence of a request from the wireless device.

5. The content delivery system of claim 1 wherein the one or more modules are further configured to cause the content server to:

include information in the content manifest for verifying each of the at least two content items.

6. The system of claim 1 wherein the information for identifying each of the at least two content items comprises information for verifying each of the at least two content items.

7. The system of claim 6 wherein the information for identifying and verifying each of the at least two content items comprises a checksum for each of the at least two content items.

8. The system of claim 1 wherein the set of content comprises at least one updated content item corresponding to changes to existing content previously delivered to the wireless device, and also comprises at least one old content item that is unchanged from the existing content.

9. A method, in a content server of a content delivery system, for republishing a set of push content for a wireless device, the method comprising:

sending a content manifest to the wireless device by pushing the content manifest to the wireless device, the content manifest being associated with the set of content comprising at least two content items, the content manifest providing:

information for retrieving each of the at least two content items, and information for identifying each of the at least two content items; and in response to a request from the wireless device for a selection of one or more content items selected from the at least two content items, providing the selected one or more content items;

wherein content items are not provided to the wireless device until receipt of the request from the wireless device; and wherein when the set of content comprises at least one content item which was previously provided to the wireless device, the content manifest provides information for determining whether the previously provided at least one content item has been updated.

10. The method of claim 9, wherein the set of content is assigned to the wireless device, the method further comprising:

identifying the wireless device to which the set of content is assigned; and sending the content manifest to the wireless device to which the set of content is assigned, in the absence of a request from the wireless device.

11. The method of claim 9 further comprising:

including information in the content manifest for verifying each of the at least two content items.

12. The method of claim 9 wherein the information for identifying each of the at least two content items comprises information for verifying each of the at least two content items.

13. The method of claim 12 wherein the information for identifying and verifying each of the at least two content items comprises a checksum for each of the at least two content items.

14. The method of claim 9 wherein the set of content comprises at least one updated content item corresponding to changes to existing content previously delivered to the wireless device, and also comprises at least one old content item that is unchanged from the existing content.

* * * * *